(12) United States Patent
Bleys et al.

(10) Patent No.: US 9,046,219 B2
(45) Date of Patent: Jun. 2, 2015

(54) METHOD FOR CONTROLLING A HOMOGENEOUS BATCH OF PRESSURIZED-FLUID CYLINDERS

(75) Inventors: Christian Bleys, Cerans-Foulletourte (FR); Fabrice Pin, Viroflay (FR); Philippe Deck, Montreuil (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 737 days.

(21) Appl. No.: 12/597,902

(22) PCT Filed: Mar. 27, 2008

(86) PCT No.: PCT/FR2008/050536
§ 371 (c)(1),
(2), (4) Date: Oct. 27, 2009

(87) PCT Pub. No.: WO2008/139074
PCT Pub. Date: Nov. 20, 2008

(65) Prior Publication Data
US 2010/0132437 A1    Jun. 3, 2010

(30) Foreign Application Priority Data
May 3, 2007   (FR) ..................................... 07 54841

(51) Int. Cl.
*G01N 7/00*    (2006.01)
*G01M 3/04*    (2006.01)
(Continued)

(52) U.S. Cl.
CPC ............. *F17C 5/005* (2013.01); *F17C 13/003* (2013.01); *F17C 2201/0119* (2013.01);
(Continued)

(58) Field of Classification Search
CPC .......... F17C 13/003; F17C 2205/05–2205/058
USPC .................. 251/129.04; 137/488, 487.5, 557; 73/37, 37.8, 37.5, 45
See application file for complete search history.

(56) References Cited

U.S. PATENT DOCUMENTS

| 3,490,267 A | 1/1970 | Gordon | ........................ 73/23.2 |
| 4,147,893 A | 4/1979 | Matson | .................... 379/106.07 |

(Continued)

FOREIGN PATENT DOCUMENTS

| CA | 2 425 851 | 10/2003 |
| DE | 40 09 741 | 10/1991 |

(Continued)

OTHER PUBLICATIONS

International Search Report for PCT/FR2008/050536.
(Continued)

*Primary Examiner* — Randy W Gibson
*Assistant Examiner* — Natalie Huls
(74) *Attorney, Agent, or Firm* — Elwood L. Haynes

(57) ABSTRACT

The invention relates to a method for controlling a homogeneous batch (1) of pressurized fluid cylinders (2) during at least part of the use cycle of said cylinders. According to the invention, each of the cylinders (2) is provided with a valve (3) having an electronic device (4) including at least one sensor (14) for measuring the pressure (P) inside the cylinder (2), a system (44) for storing/acquiring and processing data and an electromagnetic wave transmitter (34), for example using radio frequency, designed for the remote transmission of at least one of the following items of information: the identity of the cylinder (2) and the pressure (P) measured inside said cylinder. The method includes a transmission step in which all of the cylinders (2) in the batch (1) transmit at least one item of information of the same type when they are in the same phase of the use cycle at the same time and a step in which the same-type items of information transmitted by the cylinders are compared for the automatic detection of an anomaly in the batch (1).

7 Claims, 1 Drawing Sheet

(51) Int. Cl.
 *F17C 5/00* (2006.01)
 *F17C 13/00* (2006.01)

(52) U.S. Cl.
 CPC .............. *F17C 2201/0123* (2013.01); *F17C 2205/0323* (2013.01); *F17C 2250/032* (2013.01); *F17C 2250/034* (2013.01); *F17C 2250/043* (2013.01); *F17C 2250/0473* (2013.01); *F17C 2250/0626* (2013.01); *F17C 2205/055* (2013.01)

(56) References Cited

U.S. PATENT DOCUMENTS

| | | | |
|---|---|---|---|
| 4,420,748 A | 12/1983 | Jurgen | 345/618 |
| 4,734,688 A | 3/1988 | Adams | 345/618 |
| 4,838,089 A | 6/1989 | Okada et al. | 73/727 |
| 5,016,483 A | 5/1991 | Budinger | 73/865.1 |
| 5,159,839 A | 11/1992 | Silber et al. | 73/714 |
| 5,297,423 A * | 3/1994 | Keating et al. | 73/49.2 |
| 5,379,637 A | 1/1995 | Abowd et al. | 73/290 R |
| 5,440,477 A | 8/1995 | Rohrberg et al. | 700/83 |
| 5,566,713 A | 10/1996 | Lhomer et al. | 137/613 |
| 5,578,993 A * | 11/1996 | Sitabkhan et al. | 340/614 |
| 5,648,765 A | 7/1997 | Cresap et al. | 340/10.4 |
| 5,738,145 A | 4/1998 | Daicho et al. | 137/878 |
| 6,137,417 A | 10/2000 | McDermott | 340/626 |
| 6,182,713 B1 | 2/2001 | Deck et al. | |
| 6,229,448 B1 | 5/2001 | Bennett, Jr. et al. | 340/618 |
| 6,494,343 B2 * | 12/2002 | McManus et al. | 222/55 |
| 6,672,151 B1 | 1/2004 | Schultz et al. | 73/146.5 |
| 6,789,126 B1 | 9/2004 | Saulpaugh et al. | 709/245 |
| 7,104,124 B2 | 9/2006 | Stabile et al. | 73/149 |
| 2001/0045892 A1 | 11/2001 | Thomas et al. | 340/539.22 |
| 2002/0170347 A1 | 11/2002 | Stabile et al. | 73/149 |
| 2003/0229603 A1 | 12/2003 | Childress et al. | 706/11 |
| 2004/0041709 A1 | 3/2004 | Forster | 340/603 |
| 2004/0045608 A1 | 3/2004 | Peters et al. | 137/552.7 |
| 2004/0187095 A1 | 9/2004 | Gilfix et al. | 717/120 |
| 2005/0083198 A1 | 4/2005 | Bulin et al. | 340/539.22 |
| 2005/0210990 A1 | 9/2005 | Hayashi et al. | 73/708 |
| 2005/0274166 A1 | 12/2005 | Wu et al. | 73/1.63 |
| 2006/0011475 A1 | 1/2006 | Lin et al. | 204/404 |
| 2006/0243347 A1 | 11/2006 | Humphrey | 141/95 |
| 2007/0028673 A1 * | 2/2007 | McSheffrey et al. | 73/40 |
| 2009/0040049 A1 | 2/2009 | Delecourt et al. | 340/572.4 |
| 2010/0065146 A1 * | 3/2010 | Plummer et al. | 141/2 |
| 2010/0131213 A1 | 5/2010 | Bleys et al. | 702/50 |
| 2010/0132474 A1 | 6/2010 | Bleys et al. | 73/749 |

FOREIGN PATENT DOCUMENTS

| | | |
|---|---|---|
| DE | 101 46 457 | 4/2003 |
| DE | 20 2004 000564 | 4/2004 |
| DE | 10 2006 008427 | 10/2006 |
| EP | 0 180 662 | 5/1986 |
| EP | 0 292 606 | 11/1988 |
| EP | 0 451 897 | 10/1991 |
| EP | 0 486 922 | 5/1992 |
| EP | 0 534 876 | 3/1993 |
| EP | 0 733 889 | 9/1996 |
| EP | 0 813 022 | 12/1997 |
| EP | 0 860 354 | 8/1998 |
| EP | 0 863 794 | 9/1998 |
| EP | 0 916 891 | 5/1999 |
| EP | 0 982 121 | 3/2000 |
| EP | 1 055 862 | 11/2000 |
| EP | 1 126 202 | 8/2001 |
| EP | 1 145 740 | 10/2001 |
| EP | 1 191 276 | 3/2002 |
| EP | 1 760 640 | 3/2007 |
| EP | 1 936 255 | 6/2008 |
| EP | 1 988 327 | 11/2008 |
| FR | 2 391 455 | 12/1978 |
| FR | 2 504 650 | 10/1982 |
| FR | 2 723 202 | 2/1996 |
| FR | 2 776 768 | 10/1999 |
| FR | 2 814 794 | 4/2002 |
| FR | 2 863 037 | 6/2005 |
| FR | 2 868 160 | 9/2005 |
| FR | 2 901 873 | 12/2007 |
| FR | 2 901 874 | 12/2007 |
| FR | 2 901 875 | 12/2007 |
| FR | 2 901 876 | 12/2007 |
| FR | 2 910 591 | 6/2008 |
| FR | 2 915 798 | 11/2008 |
| FR | 2 915 799 | 11/2008 |
| FR | 2 915 800 | 11/2008 |
| FR | 2 915 801 | 11/2008 |
| FR | 2 915 821 | 11/2008 |
| GB | 1 319 764 | 6/1973 |
| GB | 2 098 758 | 11/1982 |
| GB | 2 189 887 | 11/1987 |
| GB | 2 236 839 | 4/1991 |
| GB | 2 274 331 | 7/1994 |
| GB | 2 415 072 | 12/2005 |
| IL | 100035 | 11/1994 |
| WO | WO 91 18266 | 11/1991 |
| WO | WO 98 05415 | 2/1998 |
| WO | WO 99 40553 | 8/1999 |
| WO | WO 01 69340 | 9/2001 |
| WO | WO 2004 053450 | 6/2004 |
| WO | WO 2005 093377 | 10/2005 |
| WO | WO 2006 065704 | 6/2006 |
| WO | WO 2006 074417 | 7/2006 |
| WO | WO 2007 138207 | 12/2007 |
| WO | WO 2007 138208 | 12/2007 |
| WO | WO 2008 139073 | 11/2008 |
| WO | WO 2008 139074 | 11/2008 |
| WO | WO 2008 139075 | 11/2008 |
| WO | WO 2008 139081 | 11/2008 |

OTHER PUBLICATIONS

French Search Report for related FR 2 868 160, Jan. 20, 2005.
International Search Report and Written Opinion for related PCT/FR2005/050177, Sep. 26, 2005.
French Search Report for related FR 2 901 873, Mar. 13, 2007.
International Search Report and Written Opinion for related PCT/FR2007/051229, Oct. 30, 2007.
French Search Report for related FR 2 901 874, Mar. 21, 2007.
International Search Report and Written Opinion for related PCT/FR2007/051230, Oct. 18, 2007.
French Search Report for related FR 2 901 875, Mar. 23, 2007.
French Search Report for related FR 2 901 876, Apr. 23, 2007.
European Search Report for related EP 07 30 1592, Jan. 18, 2008.
French Search Report for related FR 2 901 591, Jun. 13, 2007.
French Search Report for related FR 2 915 799, Jan. 9, 2008.
International Search Report and Written Opinion for related PCT/FR2008/050570, Dec. 4, 2008.
French Search Report for related FR 2 915 800, Sep. 21, 2007.
International Search Report and Written Opinion for related PCT/FR2008/050534, Sep. 9, 2008.
French Search Report for related FR 2 915 801, Sep. 25, 2007.
Written Opinion for related PCT/FR2008/050536, Sep. 9, 2008.
French Search Report for related FR 2 915 798, Sep. 24, 2007.
Written Opinion for related PCT/FR2008/050537, Sep. 26, 2008.
European Search Report for related EP 08 30 5103, Aug. 28, 2008.
French Search Report for related FR 2 901 821, Dec. 7, 2007.

* cited by examiner

METHOD FOR CONTROLLING A HOMOGENEOUS BATCH OF PRESSURIZED-FLUID CYLINDERS

This application is a 371 of International PCT Application PCT/FR2008/050536, filed Mar. 27, 2008, the entire contents of which are incorporated herein by reference.

FIELD OF THE INVENTION

The present invention relates to a method for checking a homogeneous batch of pressurized-fluid cylinders.

The invention relates more specifically to a method for checking a homogeneous batch of cylinders of pressurized-fluid, particularly of pressurized gas, during at least part of the cycle of use of said cylinders.

BACKGROUND

Controlling and monitoring cylinders of conditioned gas during their cycle of use is of key importance on an industrial scale.

This is because the checking of cylinders of conditioned gas is subject to safety and industrial efficiency requirements and thereby entails a significant amount of logistic support and labor. This is a particularly sensitive issue in the medical field where a defective cylinder or a cylinder containing an incorrect mixture may have serious consequences.

It is an object of the present invention to alleviate all or some of the abovementioned disadvantages of the prior art.

SUMMARY OF THE INVENTION

The present invention provides a method for checking a homogeneous batch of pressurized-fluid cylinders during at least part of the cycle of use of the cylinders, the cylinders each being equipped with a valve provided with an electronic device comprising at least one sensor for measuring the pressure (P) obtaining inside the cylinder, a data storage/acquisition and processing system and an emitter of electromagnetic waves designed to transmit to a distance at least one of the information items from among: the identity of the cylinder and the pressure (P) measured inside the cylinder, the method involving an emission step in which all the cylinders of the batch emit at least one information item of the same nature when they are simultaneously in one and the same phase of the cycle of use, and a step of comparing the information items of the same nature emitted by the cylinders in order automatically to detect an anomaly in the batch.

DETAILED DESCRIPTION OF THE INVENTION

Figure 1:
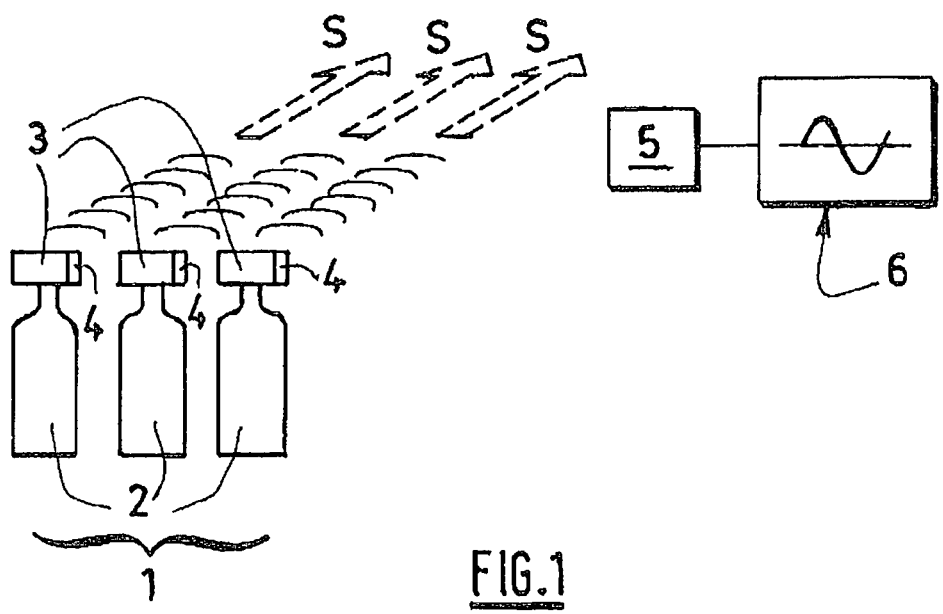
FIG. 1 depicts a schematic and partial view illustrating the structure and operation of the checking of a pressurized-fluid cylinder batch according to the invention.

To this end, the invention proposes a method for checking a homogeneous batch of pressurized-fluid cylinders during at least part of the cycle of use of said cylinders, the cylinders each being equipped with a valve provided with an electronic device comprising at least one sensor for measuring the pressure obtaining inside the cylinder, a data storage/acquisition and processing system and an emitter of electromagnetic waves, for example at radio frequency, designed to transmit to a distance at least one of the information items from among: the identity of the cylinder and the pressure measured inside said cylinder, the method involving an emission step in which all the cylinders of the batch emit at least one information item of the same nature when they are simultaneously in one and the same phase of the cycle of use, and a step of comparing the information items of the same nature emitted by the cylinders in order automatically to detect an anomaly in the batch.

Furthermore, embodiments of the invention may include one or more of the following features:
- the emission step is performed independently by each electronic device by automatically and repeatedly emitting information at determined time intervals,
- the emission step is performed independently and automatically by each electronic device as soon as the data storage/acquisition and processing system detects a trigger condition relating to one of the items of information, such that a pressure threshold (P) is reached,
- each emission of information by an emitter is performed by successively sending out several redundant identical messages,
- the cycle of use of the batch of cylinders comprises a pre-conditioning phase during which the comparison step comprises: comparing the number of cylinders detected against a number of cylinders initially intended for the conditioning, and comparing the type of cylinders detected against the intended conditioning, in order to verify that the number and type of cylinder conforms to the intended conditioning,
- the cycle of use of the batch of cylinders comprises a conditioning phase during which the cylinders of the batch are subjected to one or more filling operations and possibly to one or more withdrawing operations and possibly to one or more cleaning operations, the comparison step comprising: comparing curves of the variation in pressures (P) of the cylinders which have been obtained from the pressure values (P) measured by the sensors and emitted successively by the emitters so as to detect any curve of the pressure variation of a cylinder that is inconsistent with all the other curves and is the result, for example, of a valve that is closed and/or of a valve shutter that is defective,
- the cycle of use of the batch of cylinders comprises a post-conditioning phase, the method comprising a step of recording the values of the final pressure (P) measured in each of the cylinders and possibly the value of the final temperature (T) in each of the cylinders as measured by a temperature (T) sensor,
- the cycle of use of the batch of cylinders comprises a quarantine or storage phase during which the cylinders of the batch are not used, the comparison step comprising: comparing the curves of variation in pressures (P) of the cylinders or comparing the values of the pressure (P) in each cylinder before and after the quarantine phase in order to detect a cylinder that is suffering from a slow leak,
- during the quarantine or storage phase, the comparison step comprises comparing the number of cylinders detected on the basis of the information received against the predefined number of cylinders,
- the cycle of use of the batch of cylinders comprises a phase of delivering the batch, during which phase the comparison step comprises comparing and possibly recording characteristics of the batch (1) against a predefined batch, the electronic device comprises a battery and a temperature (T) sensor, the information emitted during the emission step comprising: the identity of the cylinder, the pressure (P) measured inside said cylinder, the measured temperature (T) and possibly the state of the battery.

For a further understanding of the nature and objects for the present invention, reference should be made to the detailed description, taken in conjunction with the accompanying figures, in which like elements are given the same or analogous reference numbers.

Other particulars and advantages will become apparent from reading the description which follows, which is given with reference to the figures.

DESCRIPTION OF THE FIGURES

FIG. 1 schematically depicts a homogeneous batch of identical pressurized-gas cylinders 2.

Each cylinder 2 is equipped with a valve 3 provided with an electronic device 4 comprising at least one sensor 14 for measuring the pressure P obtaining inside the cylinder 2, a data storage/acquisition and processing system 44 and an emitter 34 of electromagnetic waves, for example at radio frequency, designed to transmit to a distance at least one of the information items from among: the identity of the cylinder 2 and the pressure P measured inside said cylinder (or an item of data representative of the pressure, such as the remaining capacity).

Figure 2:
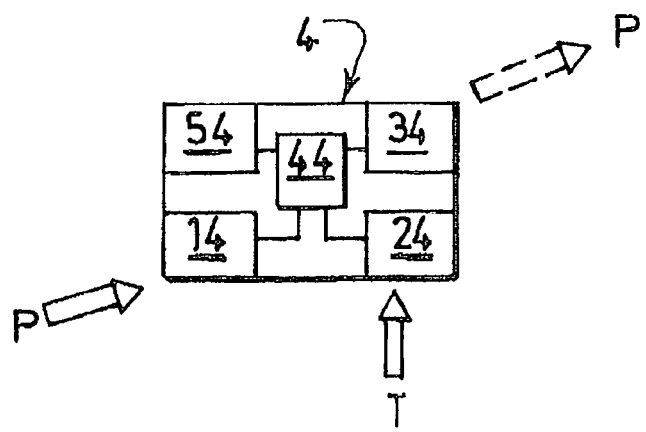
FIG. 2 depicts a schematic and partial view illustrating the structure and operation of one example according to the invention, of an electronic measurement and communication device carried by each cylinder of the batch of FIG. 1.

As depicted in FIG. 2, the pressure P sensor 14, the data storage/acquisition and processing system 44, the emitter 34 of electromagnetic waves, a battery 54 and possibly a wave receiver and other elements such as a temperature T sensor 24 may be incorporated into one and the same device 4 known as "electronic pressure gauge" fitted in place of a mechanical pressure gauge of known type. An example of an electronic pressure gauge is described, for example, in document WO 2005/09337.

The electronic pressure gauge 4 is able to communicate with a reception member 5 (emitter) coupled (directly or remotely) to a data processing system such as a computer 6.

By equipping, according to the invention, all the cylinders of an identical batch with such an electronic pressure gauge 4, the batch 1 can be controlled and monitored as follows.

The electronic pressure gauge 4 provided with radio frequency communication members may send out to a distance a signal S in the form, for example, of three redundant frames containing, by way of non-limiting example: the identifier of the cylinder 2, the measured pressure P, the measured temperature T and various statuses (for example a low-pressure or high-pressure alarm, a battery state, etc.).

The signal S is sent out automatically by each electronic pressure gauge 4 more or less frequently according to whether or not it is in use (for example every hour when it is not in use or every minute when it is in use). These emissions at regular frequencies may be supplemented by automatic immediate emissions if the conditions of an alarm (for example a parameterized pressure value) are all met.

Examples of phases of a cycle of use will now be described in conjunction with the invention (Filling/Quarantine/Delivery/Storage Full/In Use/Return Empty/Sort).

The emission of these signals S from a batch 1 makes it possible to locate, trace and identify the cylinders 2 of the batch 1 individually.

For a batch 1 comprising, for example, twelve cylinders 2, receipt of the twelve cylinder 2 identities makes it possible to verify that there are indeed twelve cylinders 2 in the batch 1, that the product is identical and that the docket detailing the intended filling with gas is properly suited to the type of cylinder 2.

This phase of verifying the number and identity of the cylinders 2 may be performed before a conditioning (or during this conditioning when operating concurrently).

During Conditioning:

Monitoring the conditioning curves (10 to 40 acquisitions on each of the increases and/or decreases in pressure P) of the batch 1 (in the sense of a line for simultaneously filling several cylinders 2) makes it possible to see that the conditioning is progressing correctly. Monitoring correct conditioning is characterized by pressure P curves with trends that are consistent between the cylinders 2 of the batch 1 (for example during the rinsing/filling/venting/evacuating cycles).

Thus, a cylinder 2 the valve of which may have remained closed will be easily detected and isolated because the measured pressure P would be practically zero. Likewise, a cylinder 2 the valve shutter of which may have become damaged will have an operation that is inconsistent with the other cylinders 2 of the batch 1. The latter detection is particularly tricky to effect in the prior part even though it is very important in the context of gas mixtures because there is then a high risk of obtaining mixtures of which the batch 1 is inconsistent.

After Conditioning:

It is possible to record (and to compare) the pressure/temperature thresholds obtained at the end of conditioning individually for each cylinder 2 of the batch.

During any Quarantine Period there Might be:

Examining and comparing the pressure P curves during the quarantine period makes it possible to detect and prevent any slow leaks there might be by comparing the data from one and the same cylinder 2 before and after the quarantine period and also by a comparative study of the twelve pressure curves of the batch 1.

During a Delivery Phase:

The relevant information is obtained easily and automatically and allows guarantees to be made regarding the batch 1 delivered. An automatic status report of the cylinders 2 which are contained in the delivery truck can be created. This is advantageous in order to check the compliance of the consignment. This corresponds, for example, to a centralization display indicating the status of the cylinders (full/empty, number, type) in a fire tender and/or an ambulance so that a batch can be verified prior to any intervention.

A location system (of the GPS type) may be provided in the electronic pressure gage 4 so that the suitability of the delivered product can be checked against the place of delivery.

During storage at the premises of the user: the invention allows an inventory and monitoring of the pressure curves (leak detection) as described hereinabove.

During use, the invention also makes it possible to detect anomalies by monitoring the pressure curves (leak detection) as described hereinabove.

When a delivery is returned: it is possible to monitor and count off the cylinders 2 taken back.

Sorting: The invention allows automation of the cylinders to be sought (recall of batch 1, re-testing, etc.).

The invention is not restricted to the examples described hereinabove and may also relate to a device comprising all or some of the above features.

What is claimed is:

1. A method for checking a homogeneous batch of pressurized-fluid cylinders during at least part of the cycle of use of the cylinders, the cylinders each being equipped with a valve provided with an electronic device comprising at least one sensor for measuring the pressure (P) obtained inside the cylinder, a data storage or acquisition and processing system and an emitter of electromagnetic waves designed to transmit to a distance at least one of the information items from among: the identity of the cylinder and the pressure (P) measured inside said cylinder, the method involving an emission step in which all the cylinders of the batch emit at least one information item of the same nature when they are simultaneously in one and the same phase of the cycle of use, and a step of comparing the information items of the same nature emitted by the cylinders in order to automatically to detect an anomaly in the batch, wherein the cycle of use of the batch of cylinders comprises a conditioning phase during which the cylinders of the batch are subjected to one or more filling operations and to one or more withdrawing operations and to one or more cleaning operations, the comparison step comprising: comparing curves of variation in pressures (P) of the cylinders which have been obtained from the pressure values (P) measured by the sensors and emitted successively by the emitters so as to detect any curve of the pressure variation of a cylinder that is inconsistent with all the other curves and is the result of a valve that is closed and/or of a valve shutter that is defective.

2. A method for checking a homogeneous batch of pressurized-fluid cylinders during at least part of the cycle of use of the cylinders, the cylinders each being equipped with a valve provided with an electronic device comprising at least one sensor for measuring the pressure (P) obtained inside the cylinder, a data storage or acquisition and processing system and an emitter of electromagnetic waves designed to transmit to a distance at least one of the information items from among: the identity of the cylinder and the pressure (P) measured inside said cylinder, the method involving an emission step in which all the cylinders of the batch emit at least one information item of the same nature when they are simultaneously in one and the same phase of the cycle of use, and a step of comparing the information items of the same nature emitted by the cylinders in order to automatically to detect an anomaly in the batch, wherein the emission step is performed independently by each electronic device by automatically and repeatedly emitting information at determined time intervals, wherein the emission step is performed independently and automatically by each electronic device as soon as the data storage/acquisition and processing system detects a trigger condition relating to one of the items of information, such that a pressure threshold (P) is reached, wherein each emission of information by an emitter is performed by successively sending out several redundant identical messages, wherein the cycle of use of the batch of cylinders comprises a pre-conditioning phase during which the comparison step comprises: comparing the number of cylinders detected against a number of cylinders initially intended for the conditioning, and comparing the type of cylinders detected against the intended conditioning, in order to verify that the number and type of cylinder conforms to the intended conditioning, wherein the cycle of use of the batch of cylinders comprises a conditioning phase during which the cylinders of the batch are subjected to one or more filling operations and to one or more withdrawing operations and to one or more cleaning operations, the comparison step comprising: comparing curves of variation in pressures (P) of the cylinders which have been obtained from the pressure values (P) measured by the sensors and emitted successively by the emitters so as to detect any curve of the pressure variation of a cylinder that is inconsistent with all the other curves and is the result of a valve that is closed and/or of a valve shutter that is defective.

3. The method of claim 2, wherein the cycle of use of the batch of cylinders comprises a post-conditioning phase, and in that it comprises a step of recording the values of the final pressure (P) measured in each of the cylinders and the value of the final temperature (T) in each of the cylinders as measured by a temperature (T) sensor.

4. The method of claim 3, wherein the cycle of use of the batch of cylinders comprises a quarantine or storage phase during which the cylinders of the batch are not used, the comparison step comprising: comparing the curves of variation in pressures (P) of the cylinders or comparing the values of the pressure (P) in each cylinder before and after the quarantine phase in order to detect a cylinder that is suffering from a slow leak.

5. The method of claim 4, wherein during the quarantine or storage phase, the comparison step comprises comparing the number of cylinders detected on the basis of the information received against the predefined number of cylinders.

6. The method of claim 4, wherein the cycle of use of the batch of cylinders comprises a phase of delivering the batch, during which phase the comparison step comprises comparing and recording characteristics of the batch against a predefined batch.

7. The method of claim 6, wherein the electronic device comprises a battery and a temperature (T) sensor, the information emitted during the emission step comprising: the identity of the cylinder, the pressure (P) measured inside said cylinder, the measured temperature (T) and the state of the battery.

* * * * *